US009666127B2

(12) United States Patent
Lee

(10) Patent No.: US 9,666,127 B2
(45) Date of Patent: May 30, 2017

(54) SCAN DRIVING APPARATUS AND DISPLAY APPARATUS INCLUDING THE SAME

(71) Applicant: SAMSUNG DISPLAY CO., LTD., Yongin, Gyeonggi-Do (KR)

(72) Inventor: Kwangsae Lee, Yongin (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 30 days.

(21) Appl. No.: 14/699,194

(22) Filed: Apr. 29, 2015

(65) Prior Publication Data

US 2016/0125844 A1 May 5, 2016

(30) Foreign Application Priority Data

Oct. 29, 2014 (KR) ........................ 10-2014-0148437

(51) Int. Cl.
*G06F 3/038* (2013.01)
*G09G 3/3233* (2016.01)

(52) U.S. Cl.
CPC ... *G09G 3/3233* (2013.01); *G09G 2300/0426* (2013.01); *G09G 2310/0267* (2013.01); *G09G 2310/0291* (2013.01); *G09G 2320/0223* (2013.01)

(58) Field of Classification Search
CPC ......... G09G 3/3233; G09G 2300/0426; G09G 2310/0267; G09G 2310/0291; G09G 2320/0223
See application file for complete search history.

(56) References Cited

U.S. PATENT DOCUMENTS

| | | | | |
|---|---|---|---|---|
| 2009/0225010 A1* | 9/2009 | Kimura ................ | G09G 3/3233 345/76 |
| 2013/0120339 A1* | 5/2013 | Yamamoto ........... | H03K 3/3565 345/211 |
| 2013/0278572 A1 | 10/2013 | Lee et al. | |
| 2013/0334979 A1 | 12/2013 | Nathan et al. | |
| 2015/0145902 A1* | 5/2015 | Nakayama ........... | G09G 3/3266 345/691 |

FOREIGN PATENT DOCUMENTS

| | | |
|---|---|---|
| JP | 2009-069768 A | 4/2009 |
| KR | 10-2005-0078826 A | 8/2005 |
| KR | 10-2012-0004119 A | 1/2012 |
| KR | 10-2013-0118459 A | 10/2013 |

* cited by examiner

*Primary Examiner* — Nelson Rosario
(74) *Attorney, Agent, or Firm* — Lee & Morse, P.C.

(57) ABSTRACT

A display apparatus includes a display panel including a plurality of scan lines and a plurality of pixels connected to the plurality of scan lines, and a scan driving unit to supply a scan signal to each of the plurality of pixels via the plurality of scan lines, the scan driving unit including a scan signal generation unit to generate the scan signal supplied to each of the plurality of scan lines, and a plurality of buffers respectively corresponding to the plurality of scan lines, each one of the plurality of buffers outputting a scan signal to a corresponding one of the plurality of scan lines, wherein each of the plurality of buffers includes a transistor having a size corresponding to a load of a circuit connected to an output end of a corresponding buffer.

21 Claims, 5 Drawing Sheets

SCAN DRIVING APPARATUS AND DISPLAY APPARATUS INCLUDING THE SAME

CROSS-REFERENCE TO RELATED APPLICATION

Korean Patent Application No. 10-2014-0148437, filed on Oct. 29, 2014, in the Korean Intellectual Property Office, and entitled: "Scan Driving Apparatus and Display Apparatus Including the Same," is incorporated by reference herein in its entirety.

BACKGROUND

1. Field

One or more exemplary embodiments relate to a scan driving apparatus and a display apparatus including the same.

2. Description of the Related Art

In order to display an image, a display apparatus sequentially applies a scan signal having a gate-on voltage level to each of a plurality of scan lines and also applies a data signal to each of a plurality of data lines in synchronization with the application of the scan signal. A scan driving apparatus has a structure in which a plurality of scan driving blocks are sequentially arranged in order to sequentially output the scan signal with the gate-on voltage level. The plurality of scan driving blocks may sequentially output a scan signal with the gate-on voltage level by generating the scan signal in response to a scan signal received from a previous scan driving block.

A circuit for receiving the scan signal is characterized by an impedance, and the scan signal is received by the circuit after an RC delay according to the impedance. A degree of the RC delay depends on a time constant value determined by the impedance.

SUMMARY

According to one or more exemplary embodiments, a display apparatus includes a display panel including a plurality of scan lines and a plurality of pixels connected to the plurality of scan lines, and a scan driving unit to supply a scan signal to each of the plurality of pixels via the plurality of scan lines, the scan driving unit including a scan signal generation unit to generate the scan signal supplied to each of the plurality of scan lines, and a plurality of buffers respectively corresponding to the plurality of scan lines, each one of the plurality of buffers outputting a scan signal to a corresponding one of the plurality of scan lines, wherein each of the plurality of buffers includes a transistor having a size corresponding to a load of a circuit connected to an output end of a corresponding buffer.

The size of the transistor may be defined as a ratio W/L of a channel width to a channel length of the transistor.

The size of the transistor may correspond to a load of a scan line for supplying a scan signal output from the corresponding buffer.

The size of the transistor may correspond to a number of pixels connected to the scan line.

The size of the transistor may increase as the number of pixels connected to the scan line increases.

The size of the transistor may increase as the load of the circuit increases.

The size of the transistor may increase as a scan line, through which a scan signal output from the corresponding buffer is supplied, is located closer to a center of the display panel.

The display panel may have a circular shape, numbers of pixels respectively connected to the plurality of scan lines may be different from each other, and the size of the transistor may correspond to a number of pixels connected to a scan line connected to the output end of the corresponding buffer.

The number of pixels connected to the scan line may increase as the scan line is located closer to a center of the display panel, and the size of the transistor may increase as the scan line is located closer to the center of the display panel.

The size of the transistor may increase as a time constant of the circuit increases.

According to one or more exemplary embodiments, a scan driving apparatus for supplying a scan signal to a display panel having a plurality of scan lines and a plurality of pixels connected to the plurality of scan lines includes a scan signal generation unit to generate the scan signal to be supplied to each of the plurality of scan lines, and a plurality of buffers respectively corresponding to the plurality of scan lines, each one of the plurality of buffers outputting a scan signal to a corresponding one of the plurality of scan lines, wherein each of the plurality of buffers includes a transistor having a size corresponding to a load of a circuit connected to an output end of a corresponding buffer.

The size of the transistor may be defined as a ratio W/L of a channel width to a channel length of the transistor.

The size of the transistor may correspond to a load of a scan line, through which a scan signal output from the corresponding buffer is supplied.

The size of the transistor may correspond to a number of pixels connected to the scan line.

The size of the transistor may increase as the number of pixels connected to the scan line increases.

The size of the transistor may increase as the load of the circuit increases.

The size of the transistor may increase as a scan line, through which a scan signal output from the corresponding buffer is supplied, is located closer to a center of the display panel.

The display panel may have a circular shape, numbers of pixels respectively connected to the plurality of scan lines may be different from each other, and the size of the transistor may correspond to a number of pixels connected to a scan line connected to the output end of the corresponding buffer.

The number of pixels connected to the scan line may increase as the scan line is located closer to a center of the display panel, and the size of the transistor may increase as the scan line is located closer to the center of the display panel.

The size of the transistor may increase as a time constant of the circuit increases.

BRIEF DESCRIPTION OF THE DRAWINGS

Features will become apparent to those of ordinary skill in the art by describing in detail exemplary embodiments with reference to the attached drawings, in which.

DETAILED DESCRIPTION

Figure 1:
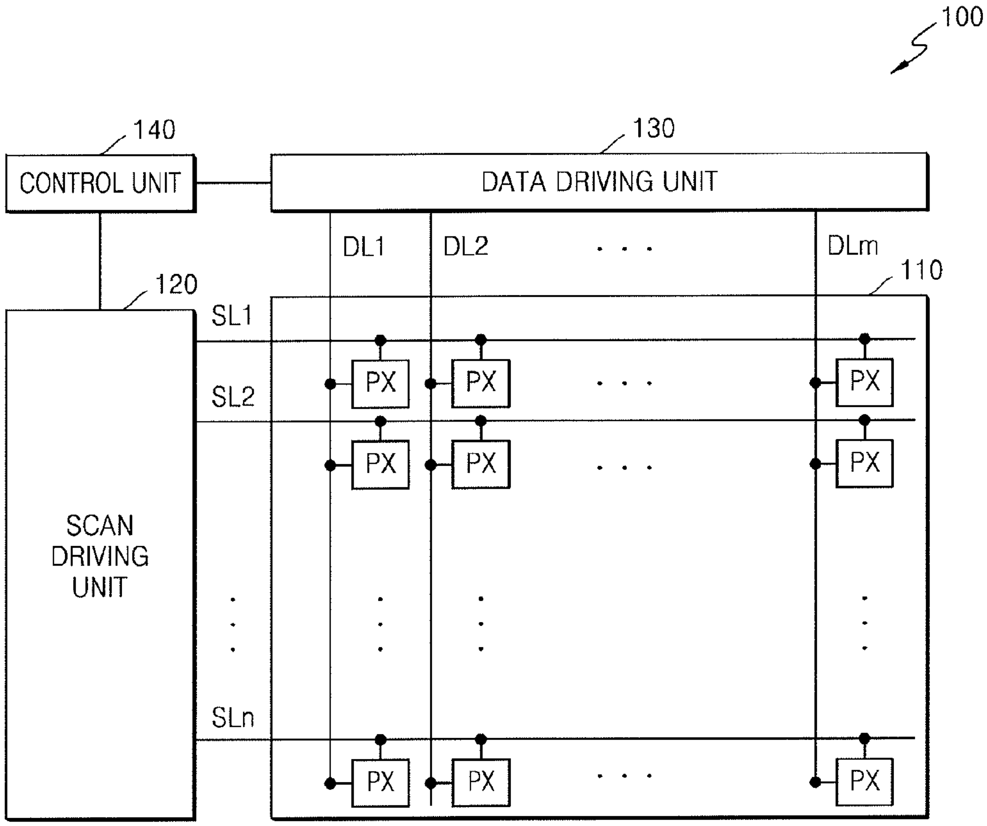
FIG. 1 illustrates a block diagram of a display apparatus according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of elements and regions may be exaggerated for clarity of illustration. It will also be understood that when an element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Further, when it is described that a certain element is "connected" to another element, it should be understood that the certain element may be "directly connected" to another element or "electrically connected" to another element via another element in the middle. Like reference numerals refer to like elements throughout.

It will also be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

FIG. 1 is a block diagram of a display apparatus 100 according to an embodiment. Referring to FIG. 1, the display apparatus 100 according to the present embodiment may include a display panel 110, a scan driving unit 120, a data driving unit 130, and a control unit 140.

The display panel 110 may include a plurality of (first to nth) scan lines SL1 to SLn, a plurality of data lines DL1 to DLm, and a plurality of pixels PX arranged approximately in a row direction and a column direction, each pixel PX being connected to each of the plurality of scan lines SL1 to SLn and each of the plurality of data lines DL1 to DLm. The plurality of scan lines SL1 to SLn extend approximately in the row direction. The plurality of data lines DL1 to DLm extend approximately in the column direction. Although the display panel 110 shown in FIG. 1 includes only the plurality of scan lines SL1 to SLn, the plurality of data lines DL1 to DLm, and the plurality of pixels PX, a power line, through which a power source voltage is supplied and the like, may be further included. Each pixel PX receives the power source voltage from the outside via the power line and emits light in response to signals supplied via each of the plurality of scan lines SL1 to SLn, and each of the plurality of data lines DL1 to DLm. Each pixel PX may include a plurality of sub-pixels (not shown).

The scan driving unit 120 generates a scan signal in response to a control signal output from the control unit 140. The scan driving unit 120 is connected to the plurality of scan lines SL1 to SLn, and may sequentially apply the scan signal to the plurality of scan lines SL1 to SLn.

The data driving unit 130 applies an image data signal to each of the plurality of data lines DL1 to DLm in response to a control signal output from the control unit 140. The data driving unit 130 may write data in the plurality of pixels PX by applying a data signal having a predetermined voltage to the plurality of data lines DL1 to DLm in response to an on-level of the scan signal.

The control unit 140 receives an image signal input from an external device. The image signal carries information on brightness of each pixel PX, wherein the brightness is expressed by a preset gradation. The control unit 140 may further receive a vertical synchronization signal, a horizontal synchronization signal, a main clock, a data enable signal, and the like. The control unit 140 may generate a first driving control signal, a second driving control signal, and an image data signal on the basis of the received signals. The control unit 140 transmits the first driving control signal and the image data signal to the data driving unit 130, and transmits the second driving control signal to the scan driving unit 120.

For example, referring to FIG. 1, the display apparatus 100 may include a rectangular display panel 110 including a same number of pixels PX for each column and including a same number of pixels PX for each row, e.g., the number of pixels PX may be the same in each column and/or in each row. That is, one pixel PX will be described hereinafter in detail with reference to FIG. 2.

Figure 2:
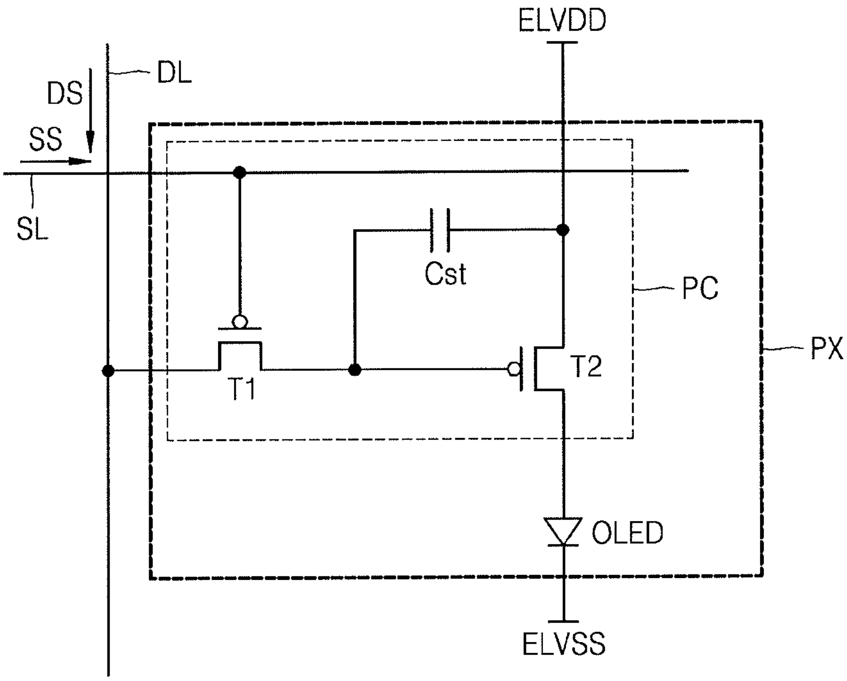
FIG. 2 illustrates a circuit diagram of a pixel according to an embodiment.

FIG. 2 is a circuit diagram of one pixel PX according to an embodiment. In FIG. 2, an arbitrary pixel PX is connected to an arbitrary scan line SL and an arbitrary data line DL, and receives a scan signal SS and a data signal DS.

Referring to FIG. 2, the pixel PX of the display apparatus 100 is connected to a first power source ELVDD and to a second power source ELVSS, and emits light corresponding to the data signal DS. Herein, the first power source ELVDD may be a high-potential power source, and the second power source ELVSS may be a low-potential power source (e.g. a ground power source) having a lower-level voltage than the first power source ELVDD.

The first power source ELVDD and the second power source ELVSS may be supplied from a separate power supply unit (not shown). To this end, the power supply unit generates the first power source ELVDD and the second power source ELVSS by transforming power input from the outside.

Referring to FIG. 2, the pixel PX includes an organic light-emitting diode OLED and a pixel circuit PC. The pixel circuit PC is connected to the data line DL and the scan line SL, and controls the organic light-emitting diode OLED. An anode of the organic light-emitting diode OLED may be connected to the pixel circuit PC, and a cathode thereof may be connected to the second power source ELVSS. The organic light-emitting diode OLED emits light of a predetermined brightness in correspondence with a current supplied to the pixel circuit PC.

The pixel circuit PC controls a current to be supplied to the organic light-emitting diode OLED in response to the data signal DS supplied via the data line DL when the scan signal SS is supplied via the scan line SL. To this end, the pixel circuit PC includes a switching transistor T1, a driving transistor T2, and a storage capacitor Cst. The driving transistor T2 is connected between the first power source ELVDD and the organic light-emitting diode OLED. The switching transistor T1 is connected among the driving transistor T2, the data line DL, and the scan line SL. The storage capacitor Cst is connected between a gate electrode and a first electrode of the driving transistor T2. The first electrode of the driving transistor T2 is a source electrode or a drain electrode.

The switching transistor T1 is turned on by the scan signal SS and charges the data signal DS in the storage capacitor Cst to transmit the data signal DS to the driving transistor T2. The driving transistor T2 receives the data signal DS from the switching transistor T1, generates a current corresponding to the data signal DS, and supplies the generated current to the organic light-emitting diode OLED. The organic light-emitting diode OLED emits light corresponding to the current supplied from the driving transistor T2.

The pixel structure of FIG. 2 was described on the basis of an organic light-emitting display apparatus. However, the display apparatus 100 according to an embodiment is not limited thereto, i.e., the pixel structure of the display apparatus 100 is not limited to the example shown in FIG. 2.

Even though the display apparatus 100 according to an embodiment is an organic light-emitting display apparatus, the pixel PX according to the present embodiment is not limited to the example shown in FIG. 2. For example, the organic light-emitting diode OLED may be replaced by another type of light-emitting device. In addition, although FIG. 2 shows a 2Tr-1Cap structure, in which one pixel PX includes two transistors T1 and T2 and one capacitor Cst, a structure of the pixel PX according to the present embodiment is not limited thereto. Therefore, one pixel PX may include two or more thin-film transistors (TFTs) and one or more capacitors, and may be formed in various structures such that a separate wiring is further formed or an existing wiring is omitted.

Figure 3:
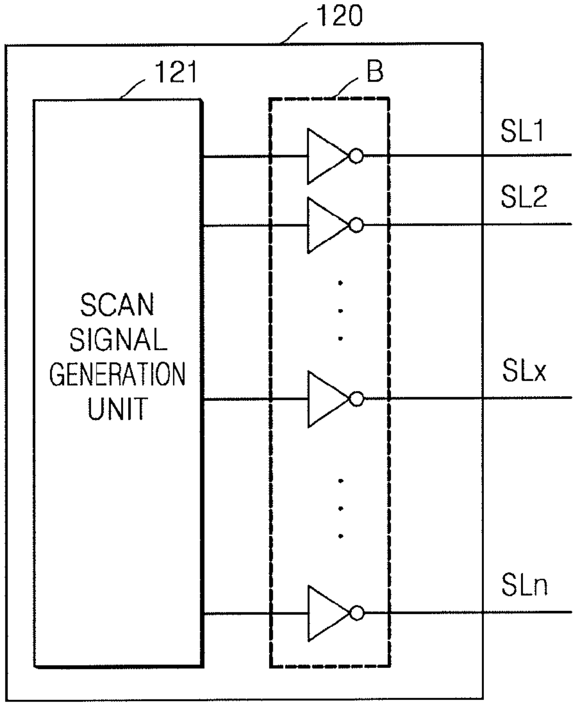
FIG. 3 illustrates a block diagram of a scan driving unit according to an embodiment.

FIG. 3 is a block diagram of the scan driving unit 120 according to an embodiment.

Referring to FIG. 3, the scan driving unit 120 according to the present embodiment includes a scan signal generation unit 121 and a plurality of buffers B. The scan signal generation unit 121 generates scan signals to be respectively supplied to the plurality of scan lines SL1 to SLn in response to various kinds of control signals supplied from the control unit 140 and a clock signal.

The plurality of buffers B are respectively connected to output ends of the scan signal generation unit 121, and respectively apply the scan signals from the scan signal generation unit 121 to the plurality of scan lines SL1 to SLn. The buffer B is a circuit provided at an output end of a circuit which supplies a signal, so the buffer B prevents the circuit which supplies a signal from being influenced by characteristics of a circuit receiving the signal. That is, the buffer B is provided to isolate a signal source from a circuit driven by the signal source.

According to an embodiment, the plurality of buffers B may have a same size or different sizes. Hereinafter, a size of each buffer B indicates a size of a transistor included in the buffer B, while the size of the transistor is defined as a channel width W, a channel length L, or a ratio W/L of the transistor.

According to an embodiment, the size of each buffer B may correspond to a load of a circuit connected to an output end of the buffer B, wherein the load of the circuit connected to the output end of the buffer B includes a load of a scan line connected to the output end of the buffer B and loads of pixels PX connected to the scan line.

Each of the scan signals supplied from the plurality of buffers B to the plurality of scan lines SL1 to SLn has an on-level or off-level value. In this case, an RC delay may occur in a scan signal to be supplied to a circuit connected to an output end of each buffer B due to an impedance of the circuit. That is, due to the impedance of the circuit connected to the output end of each buffer B, a rising time or a falling time of the scan signal may have a positive value when the scan signal is switched from on to off or from off to on.

For example, if the plurality of buffers B have the same size and loads of circuits connected to the output ends of the plurality of buffers B are different from each other, even though same scan signals are generated by the scan signal generation unit 121, rising times or falling times of the scan signals may be different from each other during a process of supplying the scan signals to the circuits connected to the output ends of the plurality of buffers B via the plurality of buffers B. For example, if a load of a circuit increases, a rising time or a falling time of a scan signal may be longer. In another example, if it is assumed that loads of circuits connected to the output ends of the plurality of buffers B are the same, as a size of a buffer B increases, a rising time or a falling time of a scan signal output from the buffer B tends to become smaller.

Therefore, the plurality of buffers B according to an embodiment may be formed to respectively have sizes corresponding to circuits connected to the output ends of the plurality of buffers B, such that a difference in rising times or falling times of scan signals output from the plurality of buffers B is minimized. Further, sizes of the plurality of buffers B may be adjusted to have the rising times or falling times of the scan signals output from the plurality of buffers B be the same, even though loads of circuits respectively connected to the output ends of the plurality of buffers B are different from each other. For example, as a load of a circuit connected to an output end of a buffer B increases, the buffer B may have a larger size.

As illustrated in FIG. 3, the plurality of scan lines SL1 to SLn are respectively connected to the output ends of the plurality of buffers B. Referring back to FIG. 1, a plurality of pixels PX are connected to each of the plurality of scan lines SL1 to SLn.

It is assumed that the scan driving unit 120 shown in FIG. 3 supplies scan signals to the display panel 110 shown in FIG. 1. Referring to FIG. 1, it may be assumed that the number of pixels PX connected to each of the plurality of scan lines SL1 to SLn is identical, and a load of each of the plurality of scan lines SL1 to SLn is identical. Therefore, it may be predicted that an RC delay of a scan signal supplied to each of the plurality of scan lines SL1 to SLn is identical when a size of a buffer B which supplies the scan signal to each of the plurality of scan lines SL1 to SLn is identical.

That is, when the scan driving unit 120 shown in FIG. 3 supplies scan signals to the display panel 110 shown in FIG. 1, the plurality of buffers B may have a same size. As described above, the size of each buffer B may be a value corresponding to a time constant of a circuit which receives a scan signal via the buffer B. Therefore, since it is predicted that the plurality of scan lines SL1 to SLn of the display panel 110 shown in FIG. 1 have a same impedance and, thus, have a same time constant, the plurality of buffers B for respectively supplying the scan signals to the plurality of scan lines SL1 to SLn may have the same size.

Figure 4:
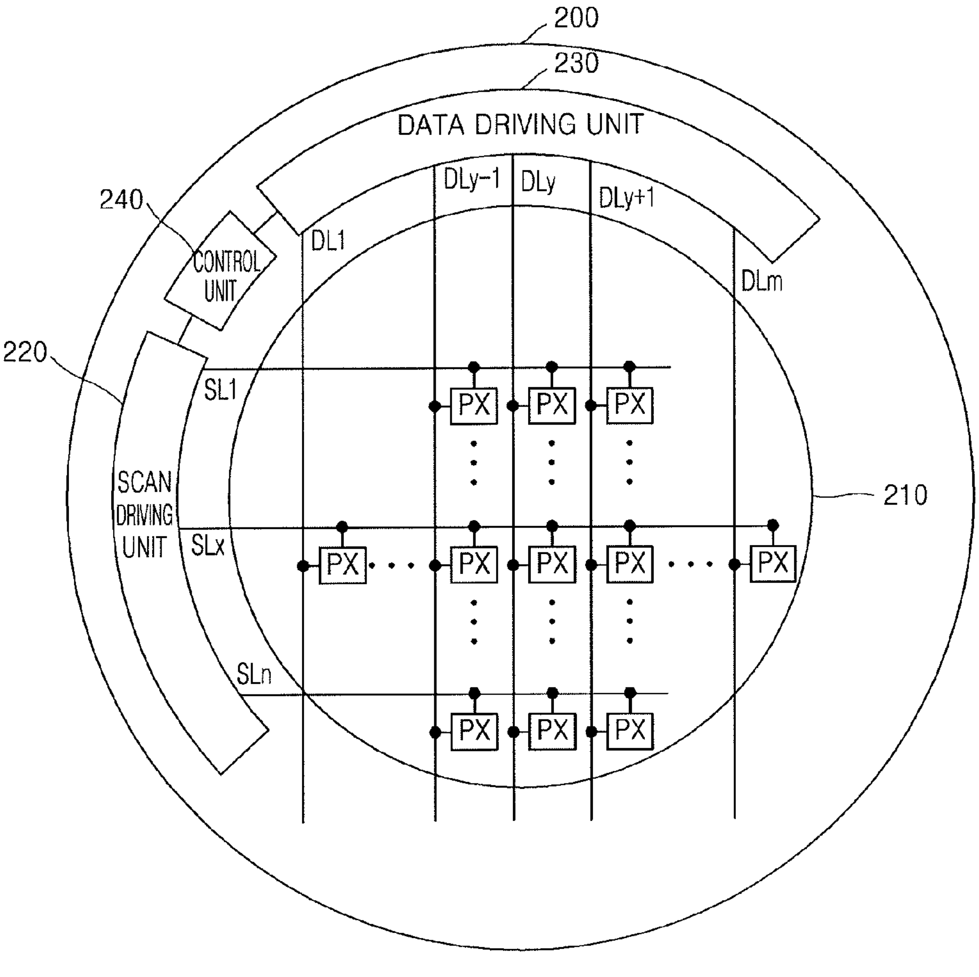
FIG. 4 illustrates a block diagram of a display apparatus according to another embodiment.

FIG. 4 is a block diagram of a display apparatus 200 according to another embodiment. Referring to FIG. 4, the display apparatus 200 according to the present embodiment may includes a display panel 210, a scan driving unit 220, a data driving unit 230, and a control unit 240.

The display panel 210 includes a plurality of scan lines SL1 to SLn, a plurality of data lines DL1 to DLm, and a plurality of pixels PX arranged approximately in a row direction and a column direction, each pixel PX being connected to each of the plurality of scan lines SL1 to SLn and each of the plurality of data lines DL1 to DLm. The plurality of scan lines SL1 to SLn extend approximately in the row direction, and the plurality of data lines DL1 to DLm extend approximately in the column direction. Although the display panel 210 shown in FIG. 4 includes only the plurality of scan lines SL1 to SLn, the plurality of data lines DL1 to DLm, and the plurality of pixels PX, a power line, through which a power source voltage is supplied and the like, may be further included. Each pixel PX receives the power source voltage from the outside via the power line and emits light in response to signals supplied via each of the plurality of scan lines SL1 to SLn and each of the plurality of data lines DL1 to DLm. Each pixel PX may include a plurality of sub-pixels (not shown).

The scan driving unit 220 generates a scan signal in response to a control signal output from the control unit 240. The scan driving unit 220 is connected to the plurality of scan lines SL1 to SLn, and may sequentially apply the scan signal to the plurality of scan lines SL1 to SLn.

The data driving unit 230 applies an image data signal to each of the plurality of data lines DL1 to DLm in response to a control signal output from the control unit 240. The data driving unit 230 may write data in the plurality of pixels PX by applying a data signal having a predetermined voltage to the plurality of data lines DL1 to DLm in response to an on-level of the scan signal.

The control unit 240 receives an image signal input from an external device. The image signal carries information on brightness of each pixel PX, wherein the brightness is expressed by a preset gradation. The control unit 240 may further receive a vertical synchronization signal, a horizontal synchronization signal, a main clock, a data enable signal, and the like. The control unit 240 may generate a first driving control signal, a second driving control signal, and an image data signal on the basis of the received signals. The control unit 240 transmits the first driving control signal and the image data signal to the data driving unit 230, and transmits the second driving control signal to the scan driving unit 220. A structure of each pixel PX shown in FIG. 4 may be the same as the structure of each pixel PX shown in FIG. 2.

Referring to FIG. 4, the display apparatus 200 according to the present embodiment may include a circular display panel 210 including a different number of pixels PX for each column and including a different number of pixels PX for each row. For example, the numbers of pixels PX connected to each one of the plurality of scan lines SL1 to SLn of the display apparatus 200 may be different from each other. However, this does not indicate that scan lines including a same number of pixels PX do not exist among the plurality of scan lines SL1 to SLn of the display apparatus 200. That is, the numbers of pixels PX connected to the plurality of scan lines SL1 to SLn may be different from each other, wherein some scan lines thereof may be connected to a same number of pixels PX. Accordingly, loads of the plurality of scan lines SL1 to SLn may be different from each other, e.g., in accordance with a number of pixels PX connected thereto. As the number of pixels PX connected to each of the plurality of scan lines SL1 to SLn increases, a load of a corresponding one of the plurality of scan lines SL1 to SLn may increase, and accordingly, an RC delay in a scan signal applied to the corresponding one of the plurality of scan lines SL1 to SLn may increase more.

Figure 5:
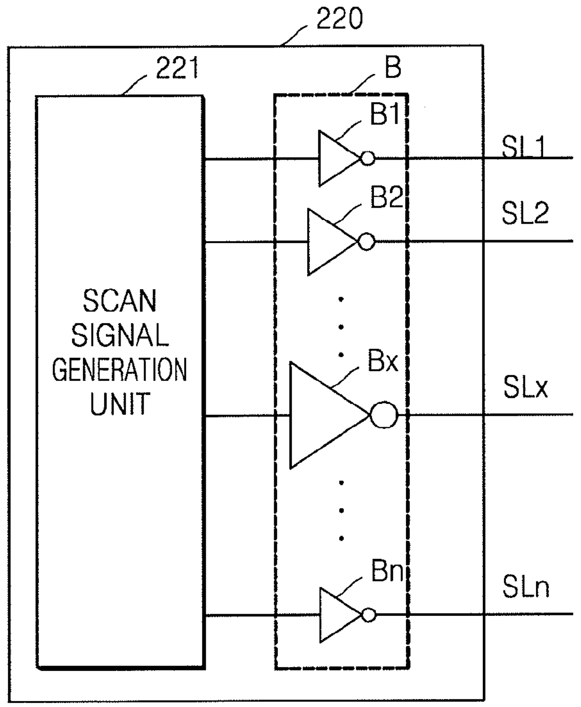
FIG. 5 illustrates a block diagram of a scan driving unit according to another embodiment.

FIG. 5 is a block diagram of the scan driving unit 220 of the display apparatus 200. FIG. 5 is a modified example of the scan driving unit 120 shown in FIG. 3. Therefore, although omitted hereinafter, the description related to the configuration shown in FIG. 3 may also be applied to the configuration shown in FIG. 5.

Referring to FIG. 5, the scan driving unit 220 according to the present embodiment includes a signal generation unit 221 and a plurality of (first to nth) buffers B (B1 to Bn). The scan signal generation unit 221 generates scan signals to be respectively supplied to the plurality of scan lines SL1 to SLn in response to various kinds of control signals supplied from the control unit 240 and a clock signal. The plurality of buffers B1 to Bn are respectively connected to output ends of the scan signal generation unit 221 and respectively apply the scan signals to the plurality of scan lines SL1 to SLn.

As described above, according to an embodiment, the plurality of buffers B1 to Bn may be formed to have a same size or different sizes. According to an embodiment, a size of each of the plurality of buffers B1 to Bn may correspond to a load of a circuit connected to an output end of a corresponding one of the plurality of buffers B1 to Bn, wherein the load of the circuit connected to the output end of the corresponding one of the plurality of buffers B1 to Bn includes a load of a scan line connected to the output end of the corresponding one of the plurality of buffers B1 to Bn and loads of pixels PX connected to the scan line. The plurality of scan lines SL1 to SLn are respectively connected to output ends of the plurality of buffers B1 to Bn, and referring to FIG. 4, a different number of pixels PX are connected to each of the plurality of scan lines SL1 to SLn.

Figure 6:
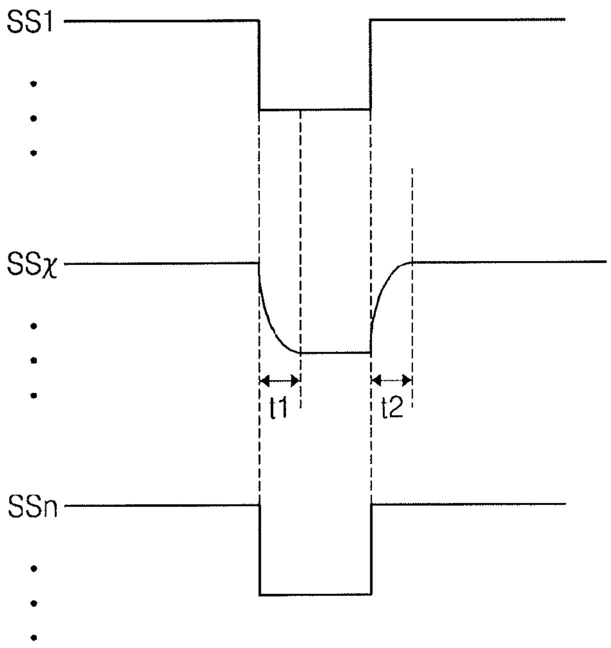
FIGS. 6 and 7 illustrate timing diagrams of scan signals to be applied to scan lines.

It is assumed that the scan driving unit 220 shown in FIG. 5 supplies scan signals to the display panel 210 shown in FIG. 4. Referring to FIG. 4, it is assumed that the number of pixels PX connected to each of the plurality of scan lines SL1 to SLn is not identical, and a load of each of the plurality of scan lines SL1 to SLn is not identical. In this case, an RC delay of a scan signal supplied to each of the plurality of scan lines SL1 to SLn would not be identical, if a size of each of the plurality of buffers B1 to Bn which supplies the scan signal to each of the plurality of scan lines SL1 to SLn were to be identical. FIG. 6 shows an example of scan signals in this case.

In detail, FIG. 6 shows an example of scan signals applied to the plurality of scan lines SL1 to SLn, if sizes of the plurality of buffers B1 to Bn of the scan driving unit 220 were to be the same even though the loads of the plurality of scan lines SL1 to SLn are not the same as shown in FIG. 4.

Referring to FIG. 6, as the number of pixels PX connected to the plurality of scan lines SL1 to SLn shown in FIG. 4 are different from each other, the loads of the plurality of scan lines SL1 to SLn are different from each other. Further, if the sizes of the plurality of buffers B1 to Bn were to be the same, delays of first to nth scan signals SS1 to SSn respectively applied to the plurality of scan lines SL1 to SLn would not be the same.

In detail, as illustrated in FIG. 6, for a scan line with a larger number of pixels PX, e.g., for the scan line SLx at the center of the display panel 210, a load would be larger. Accordingly, a delay would be larger when a value of a corresponding one of the first to nth scan signals SS1 to SSn is changed, e.g., scan signal SSx applied to the scan line SLx, so the rising time and the falling time, e.g., respective times t1 and t2 in FIG. 6, would be longer, e.g., as compared to rising and falling times in scan signals other than SSx.

When rising times and falling times of the first to nth scan signals SS1 to SSn are different from each other, even though a same data signal value is applied, an accumulated current flowing through an organic light-emitting diode OLED of each pixel PX during one frame or one subframe is not identical. Accordingly, even though values of data signals applied to the plurality of pixels PX are the same, each of the plurality of pixels PX may emit light of different brightness.

Therefore, referring back to FIG. 5, according to example embodiments, when the scan driving unit 220 shown in FIG. 5 supplies scan signals to the display panel 210 shown in FIG. 4, and the numbers of pixels PX connected to each of the plurality of scan lines SL1 to SLn is not the same, and therefore, the loads of the plurality of scan lines SL1 to SLn is not the same, the sizes of the plurality of buffers B1 to Bn for delivering the scan signals to the plurality of scan lines SL1 to SLn are formed different from each other to respectively correspond to the loads of the plurality of scan lines SL1 to SLn. As such, RC delays of scan signals respectively delivered to the plurality of scan lines SL1 to SLn are the same.

In detail, as a time constant according to a load of a scan line connected to each of the plurality of buffers B1 to Bn is larger, a size of a corresponding one of the plurality of buffers B1 to Bn may be formed larger. For example, each of the plurality of buffers B1 to Bn may, e.g., be adjusted to, have a different size, such that a time constant of a corresponding one of the plurality of buffers B1 to Bn is the same as a time constant of the entire scan line connected to the corresponding one of the plurality of buffers B1 to Bn.

For example, referring back to FIG. 4, a largest number of pixels PX are connected to a scan line SLx located at the center of the display panel 210, and the numbers of pixels connected to each of the plurality of scan lines SL1 to SLn (excluding the scan line SLx) gradually decreases as a distance of the plurality of scan lines SL1 to SLn (excluding the scan line SLx) increases from the center of the display panel 210. In this case, as shown in FIG. 5, the plurality of buffers B1 to Bn may have a large size as a load of a corresponding one of the plurality of scan lines SL1 to SLn, which is connected to a corresponding one of the plurality of buffers B1 to Bn, is large. That is, as a location of each of the plurality of scan lines SL1 to SLn is farther from the center of the display panel 210, a corresponding one of the plurality of buffers B1 to Bn for delivering a scan signal to a corresponding one of the plurality of scan lines SL1 to SLn may have a smaller size. In other words, as sizes of the plurality of buffers B1 to Bn are adjusted with respect to the load in corresponding scan lines SL1 to SLn, and as the number of pixels connected to each of the plurality of scan lines SL1 to SLn decreases as a distance of the plurality of scan lines SL1 to SLn increases from the center of the display panel 210, the sizes of the buffers B1 to Bn decrease as a distance thereof increases from the center of the display panel 210.

In detail, referring to FIG. 5, a size of the first buffer B1 for supplying a scan signal to the first scan line SL1 is formed smaller than a size of the xth buffer for supplying a scan signal to the xth scan line SLx located at the center of the display panel 210. This is an example that sizes of the plurality of buffers B1 to Bn are formed different from each other to correspond to a fact that a load of the first scan line SL1 is smaller than that of the xth scan line SLx. Scan signals in this case are illustrated in FIG. 7.

Figure 7:
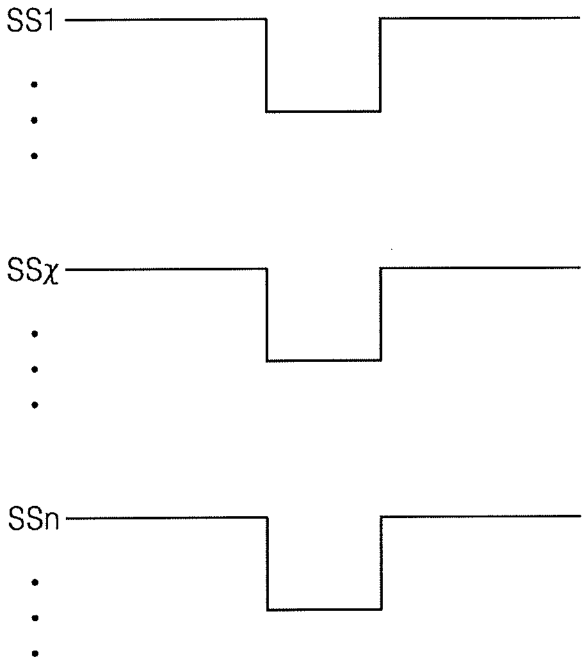

In detail, FIG. 7 shows an example of scan signals applied to the plurality of scan lines SL1 to SLn when loads of the plurality of scan lines SL1 to SLn are not the same as shown in FIG. 4, and accordingly, sizes of the plurality of buffers B1 to Bn of the scan driving unit 220 are also not the same. Referring to FIG. 7, even though the loads of the plurality of scan lines SL1 to SLn are different from each other, since the numbers of pixels PX connected to the plurality of scan lines SL1 to SLn shown in FIG. 4 are different from each other, the sizes of the plurality of buffers B1 to Bn are formed to respectively correspond to the loads of the plurality of scan lines SL1 to SLn. Thus, delays of first to nth scan signals SS1 to SSn respectively applied to the plurality of scan lines SL1 to SLn are the same.

As such, when rising times and falling times of the first to nth scan signals SS1 to SSn are the same, when a same data signal value is applied, an accumulated current flowing through an organic light-emitting diode OLED of each pixel PX during one frame or one subframe is identical. Accordingly, when values of data signals applied to the plurality of pixels PX are the same, even though the loads of the plurality of scan lines SL1 to SLn are different from each other, the plurality of pixels PX may emit light of same brightness.

As a summary of the description related to FIG. 5, when the scan driving unit 220 shown in FIG. 5 supplies scan signals to the display panel 210 shown in FIG. 4, the plurality of buffers B1 to Bn may have different sizes. As described above, a size of each of the plurality of buffers B1 to Bn may be formed as a value corresponding to a time constant of a circuit which receives a scan signal via a corresponding one of the plurality of buffers B1 to Bn. Therefore, since it is predicted that the plurality of scan lines SL1 to SLn of the display panel 210 shown in FIG. 4 have different impedances and thus have different time constants, sizes of the plurality of buffers B1 to Bn for respectively supplying scan signals to the plurality of scan lines SL1 to SLn may also be formed different from each other so as to respectively correspond to the impedances of the plurality of scan lines SL1 to SLn. In this case, the sizes of the plurality of buffers B1 to Bn are formed to respectively correspond to loads of the plurality of scan lines SL1 to SLn respectively connected to the output ends of the plurality of buffers B1 to Bn. As a load is larger, a corresponding buffer size may be formed larger.

Although FIGS. 6 and 7 show that rising times and falling times of some scan signals are 0, this is only for convenience of description, and the present embodiment is not limited thereto. The rising times and falling times may have positive values. In FIG. 6, a rising time and a falling time of the first scan signal SS1 applied to the first scan line SL1 may have positive values but may be respectively less than a rising time t2 and a falling time t1 of an xth scan signal SSx applied to the xth scan line SLx. In FIG. 7, rising times and falling times of the first to nth scan signals SS1 to SSn applied to the plurality of scan lines SL1 to SLn may have same positive values.

Figure 8:
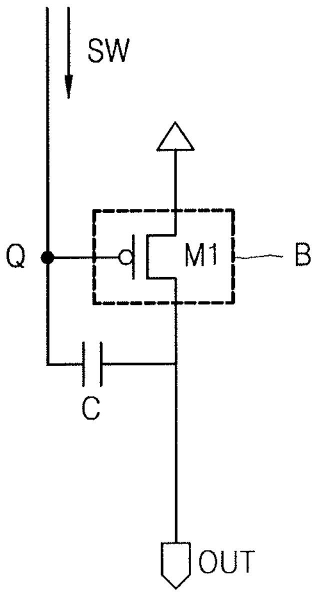
FIG. 8 illustrates a circuit diagram of a buffer according to an embodiment.

FIG. 8 is a circuit diagram of a buffer B according to an embodiment. In detail, FIG. 8 is a circuit diagram of a partial circuit of the scan driving unit 120 according to an embodiment.

Referring to FIG. 8, the buffer B includes a transistor M1. The transistor M1 is turned on by a voltage of a node Q, when a capacitor C is charged by a switching signal SW generated by the scan signal generation unit 121, and outputs a power source voltage supplied to a first electrode of the transistor M1 to an output terminal OUT connected to a second electrode of the transistor M1. The power source voltage may be voltage corresponding to an on-level of a scan signal.

In the embodiments described above, a size of a transistor included in each of the plurality of buffers B may indicate a size of the transistor M1 shown in FIG. 8. In more detail, the size of the transistor included in each of the plurality of buffers B may indicate a ratio W/L of a channel width W to a channel length L of the transistor M1 shown in FIG. 8.

Although FIG. 8 shows that the transistor M1 is a p-channel field effect transistor, the transistor M1 may be an n-channel field effect transistor. The transistor M1 may be any one of an amorphous-silicon (Si) TFT, a low temperature poly-silicon (LTPS) TFT, and an oxide TFT. The oxide TFT may have an oxide. e.g., amorphous indium gallium zinc oxide (IGZO), zinc oxide (ZnO), titanium oxide (TiO), or the like, as an active layer.

In the embodiments described above, although the scan driving units 120 or 220 may be produced as a scan driving apparatus by a separate process and then be combined with the display panels 110 or 210 to thereby become a component of the display apparatus 100 or 200, the embodiments are not limited thereto. For example, the scan driving unit 120 or 220 may be directly formed at an edge of the display panel 110 or 210 by a thin film process to thereby become one body with the display panel 110 or 210.

As described above, according to the one or more of the above exemplary embodiments, a scan driving apparatus and a display apparatus using the same have improved electrical characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display apparatus, comprising:

a display panel including a plurality of scan lines and a plurality of pixels connected to the plurality of scan lines; and a scan driver to supply a scan signal to each of the plurality of pixels via the plurality of scan lines, the scan driver including:

a scan signal generator to generate the scan signal supplied to each of the plurality of scan lines, the plurality of scan lines including a first scan line coupled to first pixels of the plurality of pixels and a second scan line coupled to second pixels of the plurality of pixels, and a plurality of buffers respectively corresponding to the plurality of scan lines, each one of the plurality of buffers outputting a scan signal to a corresponding one of the plurality of scan lines, the plurality of buffers including first and second buffers, wherein:

the first buffer supplies a first scan signal to the first pixels through the first scan line, and the second buffer supplies a second scan signal to the second pixels through the second scan line, wherein each of the plurality of buffers includes a transistor having a size corresponding to a load of a circuit connected to an output end of a corresponding buffer, and wherein:

a number of the first pixels is different from a number of the second pixels, and sizes of transistors of the first and second buffers are determined based on a difference value between the number of the first pixels and the number of the second pixels.

2. The display apparatus as claimed in claim 1, wherein the size of the transistor is defined as a ratio W/L of a channel width to a channel length of the transistor.

3. The display apparatus as claimed in claim 1, wherein the size of the transistor corresponds to a load of a scan line for supplying a scan signal output from the corresponding buffer.

4. The display apparatus as claimed in claim 3, wherein the size of the transistor corresponds to a number of pixels connected to the scan line.

5. The display apparatus as claimed in claim 4, wherein the size of the transistor increases as the number of pixels connected to the scan line increases.

6. The display apparatus as claimed in claim 1, wherein the size of the transistor increases as the load of the circuit increases.

7. The display apparatus as claimed in claim 1, wherein the size of the transistor increases as a scan line, through which a scan signal output from the corresponding buffer is supplied, is located closer to a center of the display panel.

8. The display apparatus as claimed in claim 1, wherein the display panel has a circular shape, numbers of pixels respectively connected to the plurality of scan lines are different from each other, and the size of the transistor corresponds to a number of pixels connected to a scan line connected to the output end of the corresponding buffer.

9. The display apparatus as claimed in claim 8, wherein:

the number of pixels connected to the scan line increases as the scan line is located closer to a center of the display panel, and the size of the transistor increases as the scan line is located closer to the center of the display panel.

10. The display apparatus as claimed in claim 1, wherein the size of the transistor increases as a time constant of the circuit increases.

11. A scan driving apparatus for supplying a scan signal to a display panel having a plurality of scan lines and a plurality of pixels connected to the plurality of scan lines, the scan driving apparatus comprising:

a scan signal generator to generate the scan signal to be supplied to each of the plurality of scan lines, the plurality of scan lines including a first scan line coupled to first pixels of the plurality of pixels and a second scan line coupled to second pixels of the plurality of pixels; and a plurality of buffers respectively corresponding to the plurality of scan lines, each one of the plurality of buffers outputting a scan signal to a corresponding one of the plurality of scan lines, the plurality of buffers including first and second buffers, wherein:

the first buffer supplies a first scan signal to the first pixels through the first scan line, and the second buffer supplies a second scan signal to the second pixels through the second scan line, wherein each of the plurality of buffers includes a transistor having a size corresponding to a load of a circuit connected to an output end of a corresponding buffer, and wherein:

a number of the first pixels is different from a number of the second pixels, and sizes of transistors of the first and second buffers are determined based on a difference value between the number of the first pixels and the number of the second pixels.

12. The scan driving apparatus as claimed in claim 11, wherein the size of the transistor is defined as a ratio W/L of a channel width to a channel length of the transistor.

13. The scan driving apparatus as claimed in claim 11, wherein the size of the transistor corresponds to a load of a scan line, through which a scan signal output from the corresponding buffer is supplied.

14. The scan driving apparatus as claimed in claim 13, wherein the size of the transistor corresponds to a number of pixels connected to the scan line.

15. The scan driving apparatus as claimed in claim 14, wherein the size of the transistor increases as the number of pixels connected to the scan line increases.

16. The scan driving apparatus as claimed in claim 11, wherein the size of the transistor increases as the load of the circuit increases.

17. The scan driving apparatus as claimed in claim 11, wherein the size of the transistor increases as a scan line, through which a scan signal output from the corresponding buffer is supplied, is located closer to a center of the display panel.

18. The scan driving apparatus as claimed in claim 11, wherein the display panel has a circular shape, numbers of pixels respectively connected to the plurality of scan lines are different from each other, and the size of the transistor corresponds to a number of pixels connected to a scan line connected to the output end of the corresponding buffer.

19. The scan driving apparatus as claimed in claim 18, wherein:

the number of pixels connected to the scan line increases as the scan line is located closer to a center of the display panel, and the size of the transistor increases as the scan line is located closer to the center of the display panel.

20. The display apparatus as claimed in claim 11, wherein the size of the transistor increases as a time constant of the circuit increases.

21. The display apparatus as claimed in claim 1, wherein each of the plurality of buffers includes the transistor and a capacitor coupled between a gate electrode of the transistor and the output end of the corresponding buffer.

* * * * *